(12) United States Patent
Dustin et al.

(10) Patent No.: US 9,031,973 B2
(45) Date of Patent: May 12, 2015

(54) MANAGEMENT PLATFORM FOR DISPLAYING BENEFIT PLAN DATA TO PERMITTED ENTITIES

(75) Inventors: Lori Dustin, Hopkinton, MA (US); Richard Wood, North Reading, MA (US)

(73) Assignee: Highroads, Inc., Burlington, MA (US)

( * ) Notice: Subject to any disclaimer, the term of this patent is extended or adjusted under 35 U.S.C. 154(b) by 68 days.

(21) Appl. No.: 13/439,084

(22) Filed: Apr. 4, 2012

(65) Prior Publication Data

US 2013/0268550 A1  Oct. 10, 2013

(51) Int. Cl.
*G06F 17/30* (2006.01)
*G06Q 10/10* (2012.01)

(52) U.S. Cl.
CPC .......... *G06Q 10/105* (2013.01); *G06Q 10/1057* (2013.01)

(58) Field of Classification Search
CPC ................................................ G06F 17/30386
USPC ........................................................ 707/769
See application file for complete search history.

(56) References Cited

U.S. PATENT DOCUMENTS

| 2003/0229522 A1* | 12/2003 | Thompson et al. | 705/4 |
| 2007/0225998 A1* | 9/2007 | Howell | 705/1 |
| 2010/0100561 A1* | 4/2010 | Cooper et al. | 707/769 |
| 2011/0276493 A1* | 11/2011 | Graham et al. | 705/53 |
| 2013/0024524 A1* | 1/2013 | Graff et al. | 709/206 |

* cited by examiner

*Primary Examiner* — Etienne Leroux
*Assistant Examiner* — Cindy Nguyen
(74) *Attorney, Agent, or Firm* — David H. Judson (57) ABSTRACT

An Internet-accessible employee portal provides a display interface that enables an employee to find and review employee-specific benefits (e.g., Summary Plan Description (SPD)) information. In addition, the employee portal exports an administrative page by which permitted users (e.g., HR managers) can receive a delivery status report that consolidates delivery status information for multiple employees within the enterprise. This display facilitates electronic compliance with legal and audit requirements by correlating employee notifications and portal access reports.

9 Claims, 7 Drawing Sheets

MANAGEMENT PLATFORM FOR DISPLAYING BENEFIT PLAN DATA TO PERMITTED ENTITIES

COPYRIGHT STATEMENT

This application includes subject matter that is protected by copyright. All rights are reserved.

BACKGROUND OF THE INVENTION

1. Technical Field

The subject matter of this disclosure relates generally to computer-implemented human resource management for an enterprise.

2. Background of the Related Art

Enterprise Human Resource (HR) management often is a manually intensive process that requires a great deal of administration and paperwork. The problem is especially acute with respect to complex health care benefits, as enterprise employees are often provided an opportunity to select from numerous benefit plans, each with highly distinct, yet different options. HR managers that are tasked with designing, sourcing and managing benefits packages must also be able to organize that information and make it available and accessible to enterprise employees, a task that is often quite difficult because such information typically is maintained manually. Indeed, when an HR manager is asked by an employee or senior management to provide information on some employee-specific benefit (such as described in a Summary Plan Description (SPD)) or a vendor contract, often the desired information must be located manually. In addition, HR managers must also be able to establish that their operations (and the information provided to eligible employees) satisfy all legal and audit control requirements.

To streamline this process, it is known in the prior art to provide an enterprise with a "hosted" Human Resource (HR) solution that helps the enterprise manage the enterprise's HR programs and vendors. This type of solution may be provided as a "cloud" or so-called software-as-a-service (SaaS) offering. Such technology-enabled services typically centralize an enterprise's HR content into a single managed repository to automate the entire HR supplier management process. The solution may include appropriate computing resources to support procurement, contract, summary plan descriptions, organization negotiations, merger and acquisition and vendor management, data analytics, among others. A managed solution of this type may also automate labor-intensive tasks and streamline day-to-day operations.

While a managed solution provides significant advantages, there remains a need to provide enhancements to such services to simplify their use by employees and to enhance the administrative reporting capabilities. This disclosure addresses this need.

BRIEF SUMMARY

Generally, this disclosure provides a hosted, web-based Human Resources (HR) solution that exports an Internet-accessible employee portal. The employee portal provides a set of display interfaces that enable an enterprise employee (or other permitted user) to find and review employee-specific benefits information (such as, without limitation, a Summary Plan Description (SPD)). Preferably, the employee-specific benefits information exposed to the employee (e.g., as a response to a search query) is specific to the employee and is based on information in an eligibility file (or, more generally, a data structure), wherein data in the eligibility file identifies, for each authorized employee, one or more descriptions for the respective one or more benefit plans for which the employee is eligible and enrolled. In operation, an employee authenticates to the managed system by entering credential information (e.g., a user identifier/password pair). That credential information is saved. Based on the credential information and the information in the eligibility file, the benefit plans for which the employee is eligible are identified (or identifiable). When the employee performs a search for benefit information, a keyword associated with that search is then applied only against the benefit plans for which the employee is eligible and enrolled (as opposed to, say, all available plans). The resulting description information returned in response to the search is more useful to the employee, as it is directly targeted to the user.

In addition, the employee portal exports one or more administration page(s) by which permitted users (e.g., HR managers) can receive a delivery status report that consolidates delivery status information for multiple employees within the enterprise. This display facilitates electronic compliance with legal and audit requirements. In particular, the portal provides a Send Notifications page by which an administrator can send notifications to selected employees of plan changes, as well as a User Access Report, by which a plan administrator can verify (e.g., manually, automatically or programmatically) that a participant has been notified of the plan change and in fact has reviewed that notification.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
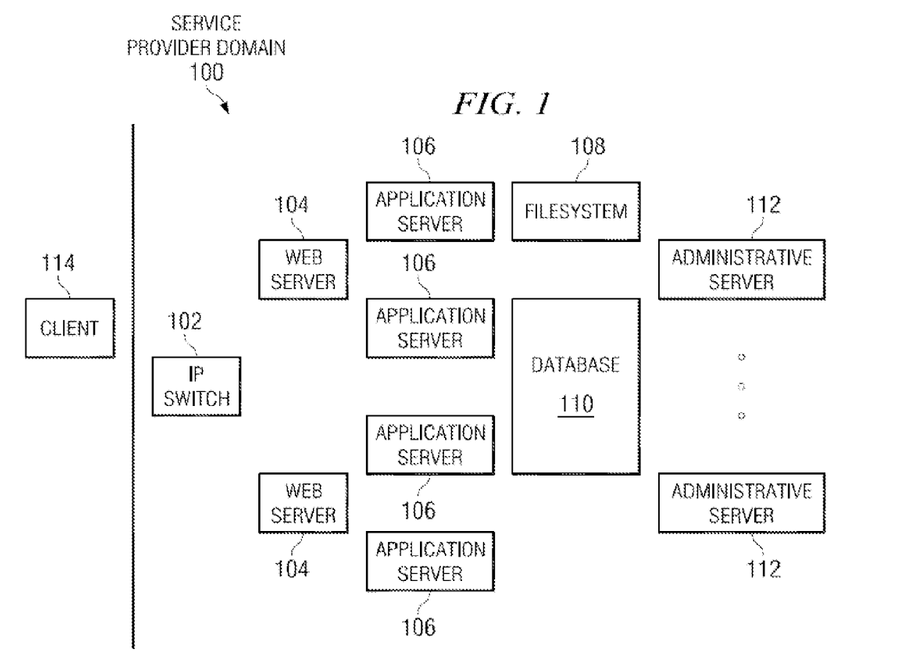
FIG. 1 is a simplified block diagram of a set of system components that provide a hosted system according to this disclosure.

FIG. 1 illustrates representative system architecture for use in implementing the subject matter described herein, which generally is an employee benefits "portal." The term "employee" should be broadly construed to refer to an enterprise employee, retiree, contractor, agent, or other permitted individual. A "portal" typically refers to an Internet-accessible display portal, typically implemented as one or more display screens. In one approach, the portal is configured as a web-based portal, in which case the display is implemented as a set of web pages that collectively form a web site. As will be described, a preferred, but non-limiting implementation of the portal is as a set of SSL-protected web pages that are exposed to the employee following a user authentication to the system.

A variety of benefit plans are presumed to be available to the employee, who may pick and choose from the available plans. Typically, each benefit plan may have an associated employee-specific benefits plan description. In one embodiment, the description is a summary plan description (SPD). The use of "SPD" herein is for example purposes and should not be taken as limiting. An enterprise has a plurality of employees, and these employees are afforded an opportunity to select one or more benefit plans, each of which has an associated SPD. According to this disclosure, an employee, using a browser and just an Internet connection, can access the employee portal site to find and review SPD information. No additional desktop software is required. Although not required, preferably the employee portal has the "look and feel" of the enterprise's own intranet or other site. The portal enables the employee to see the SPDs for the plans he or she is eligible to enroll in along with those in which he or she is already enrolled, and to search SPD text for instances of keywords. The portal also allows alerts and notifications to be sent to the employee by administrators.

Generalizing, the portal architecture of this disclosure may be implemented in or across one or more Internet-accessible data centers as a web site (typically, a set of web pages) together with associated applications running behind the site. End users operate Internet-accessible devices (e.g., desktop computers, notebook computers, Internet-enabled mobile devices, tablets, e-readers, or other devices having rendering engines, or the like) that are capable of accessing and interacting with the site. An end user machine has a web browser or other rendering engine that may implement client-side technologies (e.g., XHTML, XML, CSS, DOM, JSON, HTML-5, and the like). An end user typically accesses the site in the usual manner, i.e., by opening the browser to a Uniform Resource Locator (URL) associated with a service provider domain. The service provider domain may be a sub-domain associated with a cloud-based service offering, where the cloud service provider provides the service to multiple, disparate enterprises, divisions, or the like. In the usual case, the user may authenticate to the site (or some portion thereof) by entry of a username and password. An alternative authentication may be a single-sign on (SSO), federated single sign-on (F-SSO), Kerberos-based authentication, or the like. A connection between the end user entity machine and the system may be private (e.g., via SSL). Although connectivity via the publicly-routed Internet is typical, the end user may connect to the system in any manner over any local area, wide area, wireless, wired, fixed, virtual, private, or other network, irrespective of the access protocol.

As seen in FIG. 1, the "server side" of the system 100 preferably comprises an IP switch 102, a set of web servers 104, a set of application servers 106, a file system 108, a database 110, and one or more administrative servers 112. A representative web server is Apache (2.0 or higher) that executes on a commodity machine (e.g., an Intel-based processor running Linux 2.4.x or higher). An application server executes the one or more applications that provide the features of the site, including the SPD search and retrieval function. The file system 108 preferably is an application level distributed system that operates across a number of servers, preferably using an HTTP or HTTPS interface. The database 110 may be implemented using MySQL, or any other convenient system. The administrator servers 112 handle other back end processes that are used at the site or otherwise to facilitate the service; these back end processes including, for example, user registration, management, administration, and interoperability with third party sites and systems as may be required. As also seen in FIG. 1, the system may also include client-side code 114 that executes natively in the end user's web browser or other rendering engine. Typically, this code is served to the client machine when the end user accesses the site, although in the alternative it may be resident on the client machine persistently.

The system may be implemented within a multi-tier hosted (cloud) service. The client-side interface preferably is based on current web technology standards, including HTML 4 (or higher) and CSS style sheets. The web interface is compatible with standard browsers including, without limitation, Internet Explorer on Windows, Firefox on multiple platforms, and Safari on Mac OS X and Windows. Supporting tools include Adobe Flash player and available JavaScript libraries. Client-side interfaces include, without limitation, dynamic web pages with JavaScript for visual effects and AJAX functionality, embeddable widgets developed in Flash and HTML that can be placed on other sites, RSS feeds that provide alternate ways of accessing content, and the like. The server-side application is built on a common software suite that includes Apache, MySQL, and Perl. The server-side application is a generic Linux/Unix/Posix-style environment and is easily portable to other equivalent server platforms.

Figure 2:
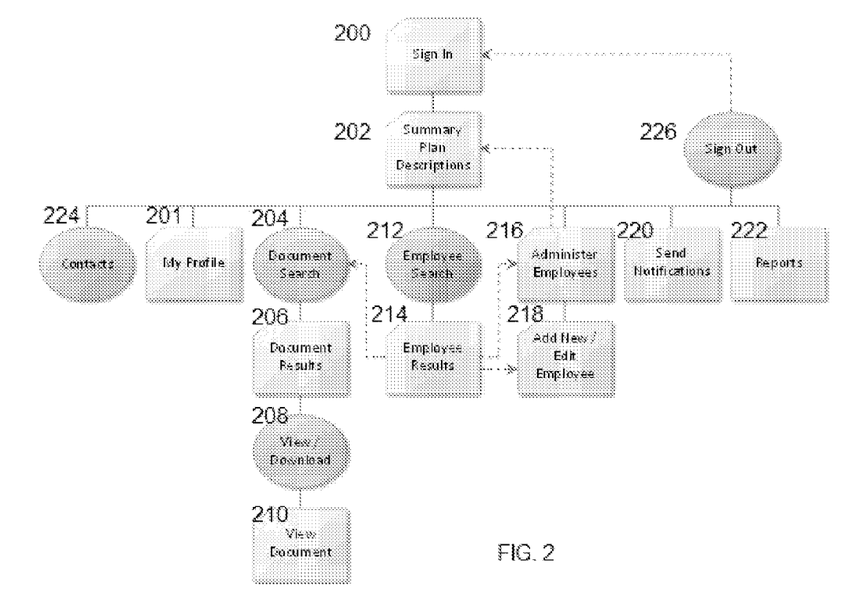
FIG. 2 is a simplified representation of the application modules and displays of the employee benefits plan portal of this disclosure.

FIG. 2 illustrates a representative application flow for the employee portal application. The display screens and operations 212, 214, 216, 218, 220 and 220 are available to administrators, who must authenticate to the system in that role with appropriate credentials. As noted above, the main functional components of the system are implemented at an Internet-accessible site, which in this case is reached by opening a browser to the domain enterprise.portal.net (this domain is merely representative). As can be seen, and with respect to the employee SPD search and retrieval functionality, the portal comprises a sign-in module 200, a summary plan descriptions module 202, a document search function 204, and a view/download module 206. In operation, an employee uses the sign-in module 200 to access the portal. The employee may authenticate to the portal in the usual manner, e.g., by entering a user-id (UID) and password, via single-sign on (SSO), federated SSO, token-based authentication, or the like. Role-based authorization may also be implemented by the sign-in module 200 to ensure that the employee has access rights to the portal resources. Upon authentication, the portal fetches and displays the Summary Plan Descriptions (SPDs) for the plans he or she is eligible to enroll in. This operation uses an eligibility file 225, which is a data structure that associates an employee credential with one or more identifiers, such as SPD identifiers. In this example scenario, each SPD identifier is associated with one or more plans that may be exposed to the employee via the portal. The SPD module 202 exposes only those benefit plans for which the employee may enroll, thus providing a much more focused user experience for the employee. Using the document search module 204, the employee can then search SPD text for instances of one or more keywords that are entered by the user into a search field (e.g., a textbox, or by selecting from pre-defined search terms). A result set of documents 206 is generated as a result of the search and retrieval function. The view/download module 208 enables the user to view or download additional information about a plan or the SPD. The resulting document 210 is then viewed or saved on the client machine.

Employee profile data is saved in the My Profile module 201, and the user may modify the data therein upon authentication. A Contacts module 224 is used to store and administer employee contact data. Selecting a "Contacts" item opens a sub-menu containing a list of links to other web sites or domains from which employee contact data may be mined or managed. A Sign-Out module 226 redirects the user to a sign-out display screen.

The administrative functions includes an employee search module 212 by which a permitted administrator may search for a particular employee set (result set 214), administer given information about an employee using module 216, add new/edit employee information using module 218, and send notifications to employees (using module 220). A report generator module 222 is used to generate reports, as will be seen.

Figure 3:
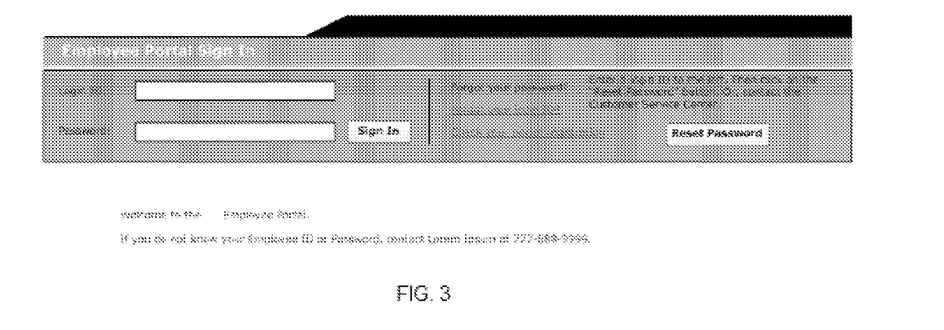
FIG. 3 illustrates a log-in display interface of the portal.
Figure 4:
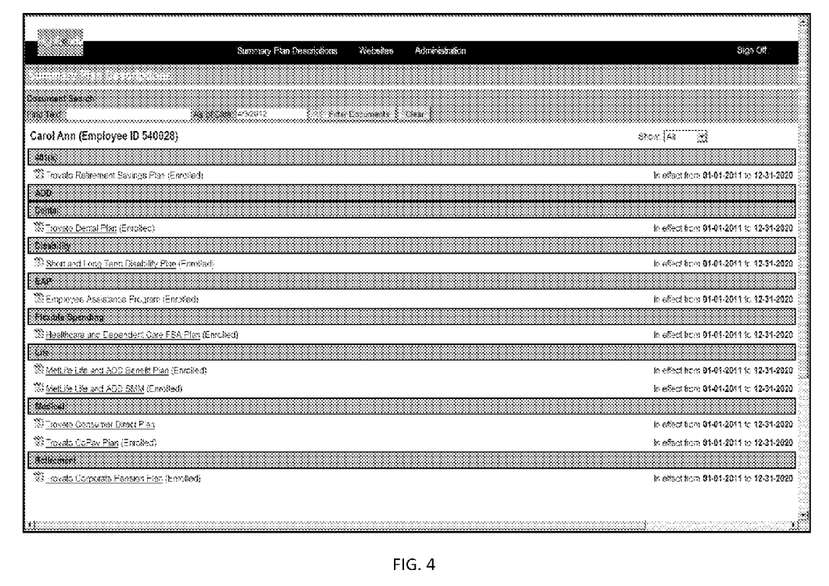
FIG. 4 illustrates an employee-specific benefits (e.g., SPD) display interface of the portal.
Figure 5:
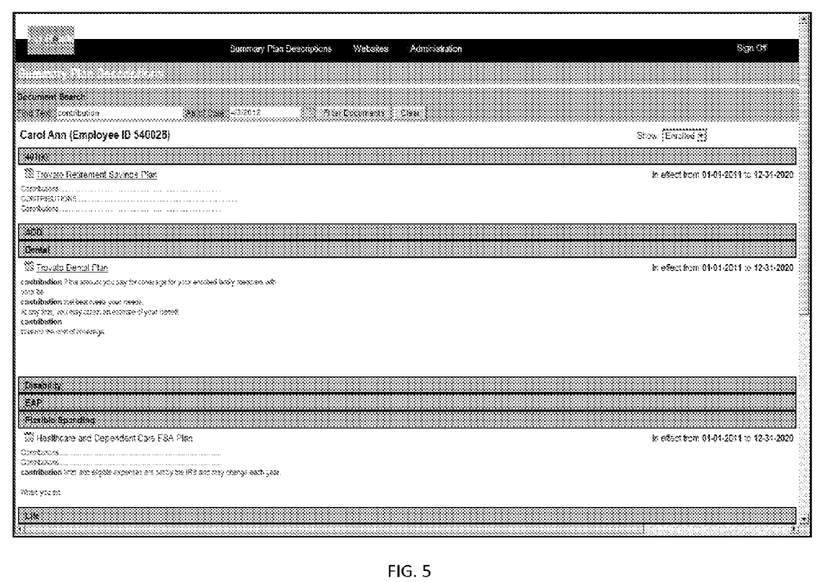
FIG. 5 illustrates the SDP display interface of FIG. 4 following entry of a text search query.

FIG. 3 illustrates a representative sign-in display screen provided by the sign-in module 200. The display includes a login identifier field and a password field. Upon entry of the user's credential information and selection of the Sign In button, the system authenticates the user and, if authentication is successful, opens the Summary Plan Description display screen shown in FIG. 4. Preferably, on initial load of this page, the search text boxes are empty, although the page displays a document result list containing results for all plans for which the user is eligible. As noted above, preferably this operation is enabled by comparing the user's credential to the information in the eligibility file; the result of this comparison is a set of one or more identifiers for the SPDs, and FIG. 4 illustrates the SPDs displayed for the identified employee. The SPDs are categorized by type (e.g., Medical, Long Term Disability, Short Term Disability, 401(k), and the like), and each SPD preferably is attached. The relevant plan information is also displayed. When the user then enters text into the Find Text box, the system automatically searches against the returned plan documents. The resulting document results 206 are then displayed, preferably with the search query highlighted, as shown in FIG. 5. The employee selects the SPD by selecting the document icon, in which case the view/download module opens or downloads the document itself to the employee's machine.

Figure 6:
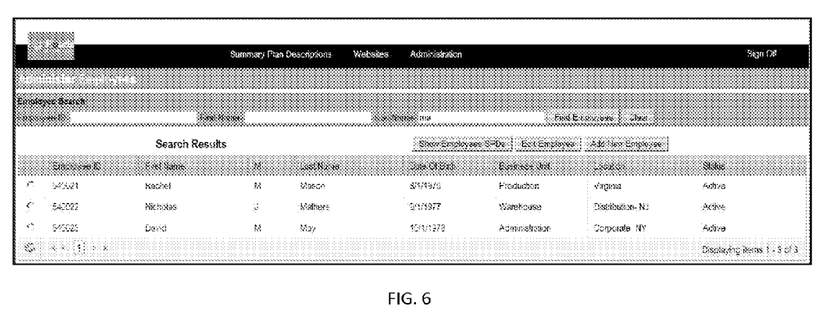
FIG. 6 illustrates an Employee Search display interface of the portal.

FIG. 6 illustrates a portion of an employee search display interface that is available to an administrator. The administrator can search for an employee by ID, or by entering the employee's first and/or last name. The Find Employee button shows the employee result grid and populates it with data for all employees matching the specified Employee ID, First Name and Last Name. After selecting an employee from the result grid (by highlighting the row), the administrator can select the Show Employee SPD button to display the plans for which the employee is eligible. The administrator then has the same view, full-text search and print capability as the employee, which enables the administrator to assist an employee who may not have Internet access currently. An Add Employee button is used to add an employer, and the Edit Employee button opens up a sub-menu to edit an employee's existing information. The Find Employee button shows the employee result grid and populates it with data for all employees matching the specified Employee ID, First Name and Last Name. The employee's status is displayed in the Status field, his or her location in the Location field, and his or her union (or other) affiliation in the Union field.

Figure 7:
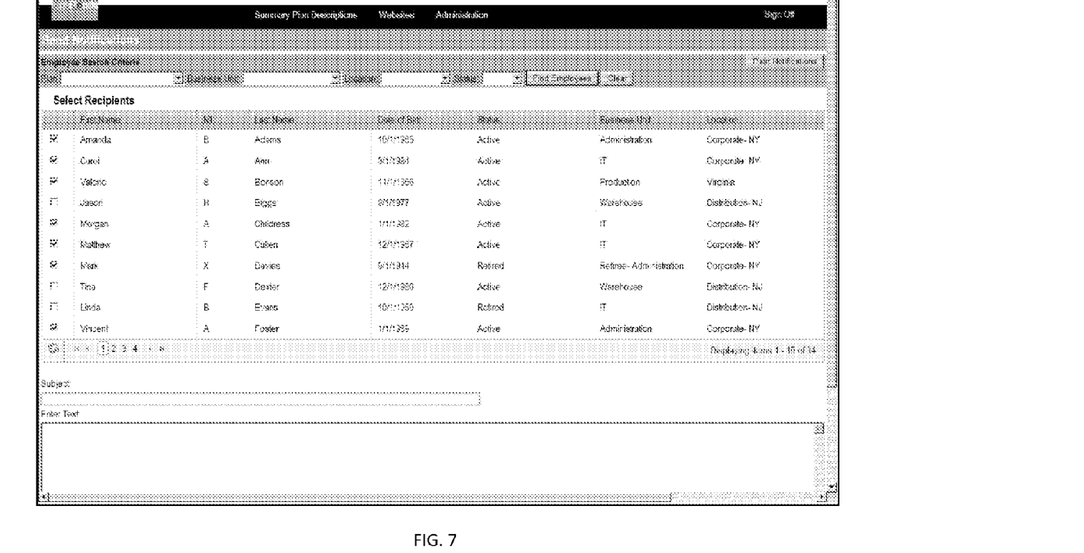
FIG. 7 illustrates a Send Notifications display interface of the portal.

FIG. 7 illustrates a Send Notifications display interface, which may be accessible via a menu item in an administration sub-menu (or otherwise as a separate page), and it allows an administrator to send notifications to users based on a set of pre-defined criteria. The Employee Selection Criteria examples preferably includes Location, Status and Union, although other criteria may be used. Each identified field is associated with a dropdown list that includes one or more entries for each such attribute. The Find Employees button shows a "Select Recipients" results grid and populates it with data for all employees matching the specified Location (if selected), Status (if selected) and Union (if selected). A checkbox column to the left of the grid is used to select a recipient. If checked, a notification email is sent to the user. The administrator selects the recipients, or the recipients may be selected programmatically. The administrator enters text in the Enter Text area and selects the Submit button to send the notification email containing the specified text.

Figure 8:
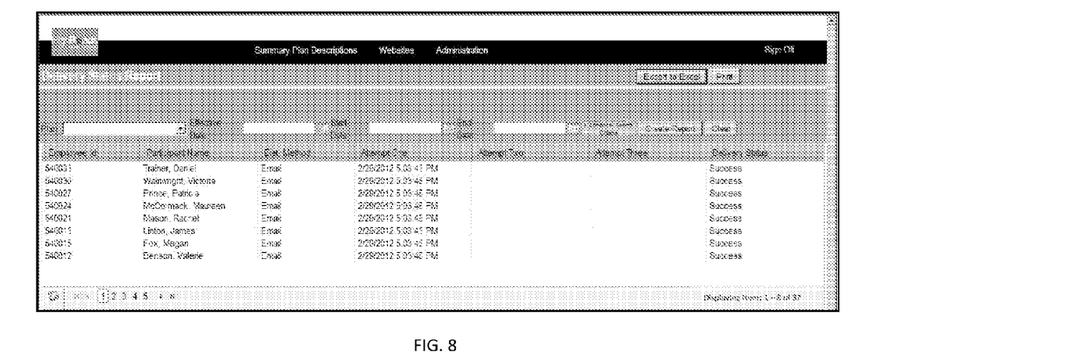
FIG. 8 illustrates a Delivery Status Report display interface of the portal.

FIG. 8 illustrates a Delivery Status Report display interface that is available to an administrator. The purpose of this report is to display, for the version of a specific plan that is (or was) in effect on a specific date, all users for whom delivery attempts were made within a given data range and the status of those delivery attempts. In this interface, the Plan list is a dropdown list from which the administrator can choose the plans for which the Delivery Status report will be run. The "Start Date" and the "End Date" are text boxes that are associated with calendar popups. The "Create Report" button generates (or re-generates) the report for the previously selected plan, displaying all users for whom a delivery attempt (number one, two or three) was made between the specified Start Date and the specified End Date. The Report preferably includes an Attempt One column, an Attempt Two column, and an Attempt Three column, together with a Delivery Status column. The information in the columns is populated as delivery attempts are made. Preferably, the delivery attempt information includes the date an attempt was made to deliver information to the participant. The Sent Via column identifies the particular delivery mechanism and the target location.

Figure 9:
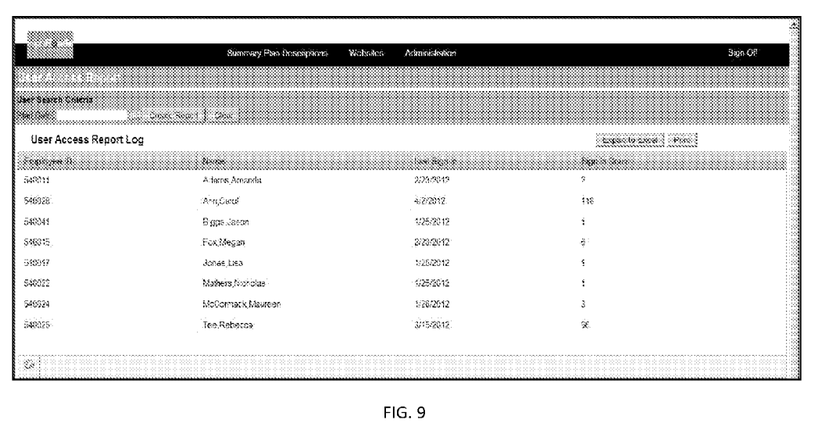
FIG. 9 illustrates a User Access Report display interface of the portal.

FIG. 9 illustrates a User Access Report display interface that is available to an administrator. The purpose of this report is to display to the administrator a list of all users who have signed into the employee portal since a specified data, their last sign-in date, and the total number of times that they have signed into the portal since the specified date. To that end, the report grid displays the Employee ID, Participant Name, Last Sign-In, and the "Sign-In Count" for each identified participant. The Start Date provides a textbox with a calendar popup. The Create Report button may be used to generate (or re-generate) the report, displaying all users who signed into the portal on or after the specified Start Date.

Figure 10:
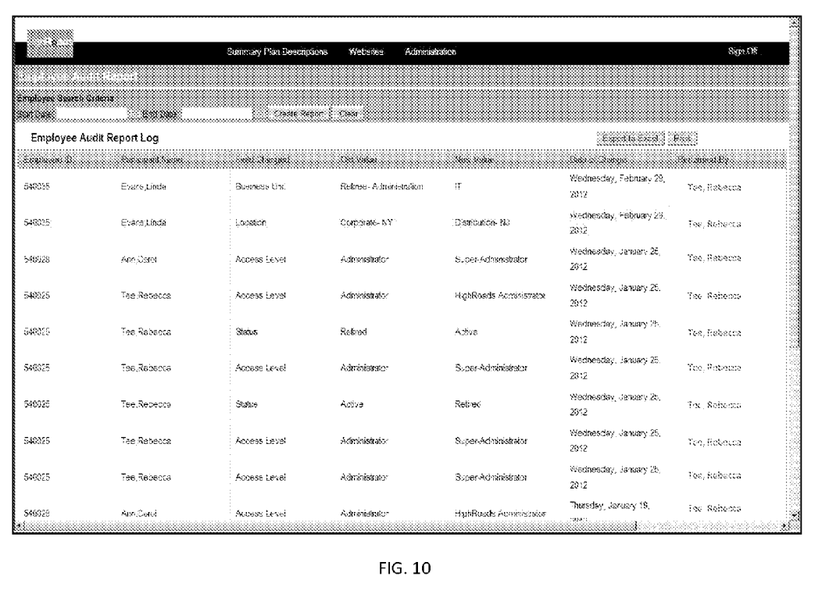
FIG. 10 illustrates an Employee Audit Report display interface of the portal.

FIG. 10 illustrates an Employee Audit Report display interface that is available to the administrator. The purpose of this report is to provide the administrator with a list of all users who have been added or edited (either by administrators within the employee portal, or through a data feed, or otherwise) within a specified time period. To this end, the data fields include Employee ID, Participant Name, Field Changed, Old Value, New Value, Change Date, and Changed By. The report selection criteria include the Start Date and End Date fields that include a calendar popup tool.

Figure 11:
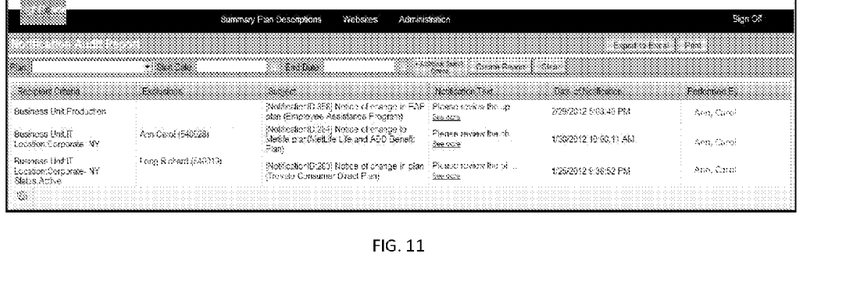
FIG. 11 illustrates a Notification Audit Report display interface of the portal.

FIG. 11 illustrates a Notification Audit Report display interface that is available to the administrator. The purpose of this report is to provide the administrator with a list of all notification email messages sent out (via the Send Notification display interface) within a specified time period. To that end, the interface includes columns identifying Location, Status, Union, Excluded Employees, Notification Date, and Performed By.

An Internet-accessible employee portal such as described above provides a set of display interfaces that enable an enterprise employee to find and review benefits (e.g., Summary Plan Description (SPD)) information. The portal also exposes a set of display interfaces for the plan administrator(s) that facilitate auditing and compliance management. Preferably, the SPD information exposed to the employee (e.g., as a response to a search query) is specific to the employee and is based on information in an eligibility file, wherein data in the eligibility file identifies, for each authorized employee, one or more SPDs for the respective one or more benefit plans for which the employee is eligible. In operation, an employee authenticates to the managed system by entering credential information (e.g., a user identifier/password pair). That credential information is saved. Based on the credential information and the information in the eligibility file, the benefit plans for which the employee is eligible are identified. When the employee performs a search for benefit information, a keyword associated with that search is then applied only against the benefit plans for which the employee is eligible. The resulting SPD information returned in response to the search is directly targeted to the user. In addition, the employee portal exports the above-identified administration page(s) by which permitted users (e.g., HR managers) can receive a delivery status report that consolidates delivery status information for multiple employees within the enterprise. This display facilitates electronic compliance with legal and audit requirements. In particular, by comparing the Delivery Status Report and the User Access Report, a plan administrator can verify (e.g., manually, automatically or programmatically) that a participant has been notified of a plan change and in fact has reviewed that notification.

The system components illustrated in FIG. 2 are a representative embodiment; it is not required that all such components be included, or that the identified boundaries be as shown. One or more components may be combined or associated with the system or other entities, as the case may be, without departing from the scope of the described subject matter. It is not required that the components be located within the same data center. As will be seen, the site preferably comprises a set of machines that execute a set of processes. A function may be implemented in a distributed manner, e.g., across a set of Intel processor (or equivalent)-based Linux (or equivalent)-based server machines that are connected in a local area network, or in any other convenient manner.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

The subject matter herein can take the form of an entirely hardware embodiment, an entirely software embodiment, or an embodiment containing both hardware and software elements. In one embodiment, the SPD search and display functionality, and the employee notification and reporting functionality, are implemented in software executing in one or more server machines. The disclosed system (or portions thereof) may take the form of a computer program product accessible from a computer-usable or computer-readable medium providing program code for use by or in connection with a computer or any instruction execution system. A computer-usable or computer readable medium can be any device or apparatus that can include, store or communicate the program for use by or in connection with the instruction execution system, apparatus, or device. The medium can be an electronic, magnetic, optical, or the like. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

While given components of the system have been described separately, one of ordinary skill will appreciate that some of the functions may be combined or shared in given instructions, program sequences, code portions, and the like.

As previously noted, the references herein to SPD are merely exemplary, as the techniques described herein may be used with respect to any employee-specific benefits and their associated plan descriptions, however designated. The portal also may be used to provide other information and services to employees including, without limitation, enabling employees to consent to receive electronic document distribution, enabling association of one or more such documents to one another, Having described our invention, what we now claim is as follows:

1. An apparatus for providing a benefits plan employee portal, comprising:
   an Internet-accessible infrastructure operating at a service provider domain, the Internet-accessible infrastructure comprising:
      a set of one or more web servers;
      a set of one or more application servers; and
      a database;
   the Internet-accessible infrastructure comprising at least one hardware element and operative to expose a set of display interfaces, the display interfaces including:
      a first display interface responsive to receipt of an authentication credential of a first employee to display, from a set of summary plan descriptions, a subset of one or more summary plan descriptions associated with one or more respective benefit plans for which the first employee is eligible as determined by the authentication credential, to receive a search query against the one or more summary plan descriptions displayed, and to display text from at least one or more of the summary plan descriptions that matches the search query;
      a second display interface to identify at least a second employee, to receive text associated with a notification, and to send the notification to the second employee, the notification being associated with a modification to a benefits plan;
      a third display interface to identify, for the second employee, one or more delivery attempts of the notification and whether the notification was delivered to the second employee; and
      a fourth display interface to identify, for the second employee, one or more access attempts by the second employee; and
   at least one application server including program code to compare data associated with the one or more delivery attempts of the notification with data associated with the one or more access requests by the second employee to establish, as a proof of compliance, that the second employee has received the notification of the modification to the benefits plan and has reviewed the notification.

2. The apparatus as described in claim 1 wherein the database stores an eligibility file, the eligibility file associating the authentication credential of the first employee with identifiers for the one or more summary plan descriptions.

3. The apparatus as described in claim 1 wherein at least one application server enforces a role-based access control to verify that an entity is authorized to access the benefits plan employee portal.

4. The apparatus as described in claim 1 wherein the first display interface is provided as one or more web pages delivered from at least one of the web servers.

5. An apparatus for providing a benefits plan employee portal, comprising:
   an Internet-accessible infrastructure operating at a service provider domain, the Internet-accessible infrastructure comprising:
   a set of one or more web servers;
   a set of one or more application servers; and
   a database;
   the Internet-accessible infrastructure comprising at least one hardware element and operative to expose a set of display interfaces, the display interfaces including:
   a first display interface to identify at least a first employee, to receive text associated with a notification, and to send the notification to the first employee, the notification being associated with a modification to a benefits plan;
   a second display interface to identify, for the first employee, one or more delivery attempts of the notification and whether the notification was delivered to the first employee; and
   a third display interface to identify, for the first employee, one or more access attempts by the first employee;
   at least one application server including program code to compare data associated with the one or more delivery attempts of the notification with data associated with the one or more access requests by the first employee to establish, as a proof of compliance, that the first employee has received the notification of the modification to the benefits plan and has reviewed the notification.

6. The apparatus as described in claim 5 wherein the display interfaces also include:
   a fourth display interface responsive to receipt of an authentication credential of a second employee to display, from a set of summary plan descriptions, a subset of one or more summary plan descriptions associated with one or more respective benefit plans for which the second employee is eligible as determined by the authentication credential, to receive a search query against the one or more summary plan descriptions displayed, and to display text from at least one or more of the summary plan descriptions that matches the search query.

7. The apparatus as described in claim 5 wherein the database stores an eligibility file, the eligibility file associating the authentication credential of the second employee with identifiers for the one or more summary plan descriptions.

8. The apparatus as described in claim 5 wherein at least one application server enforces a role-based access control to verify that an entity is authorized to access the benefits plan employee portal.

9. The apparatus as in claim 5 wherein at least one of the display interfaces is provided as one or more web pages delivered from at least one of the web servers.

* * * * *